(No Model.)
H. PUND.
COUPLING DEVICE FOR SAFE SPINDLES.
No. 317,471. Patented May 5, 1885.
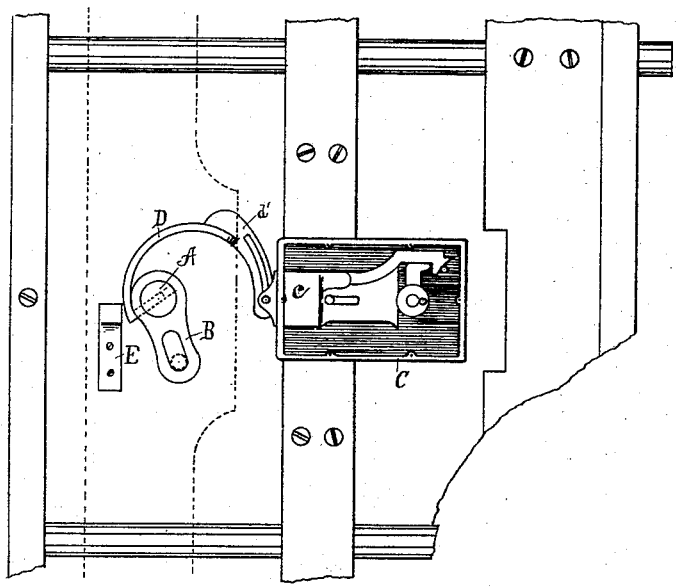
Fig 1.
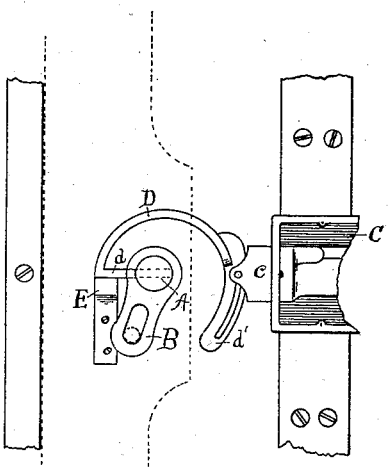
Fig 2.
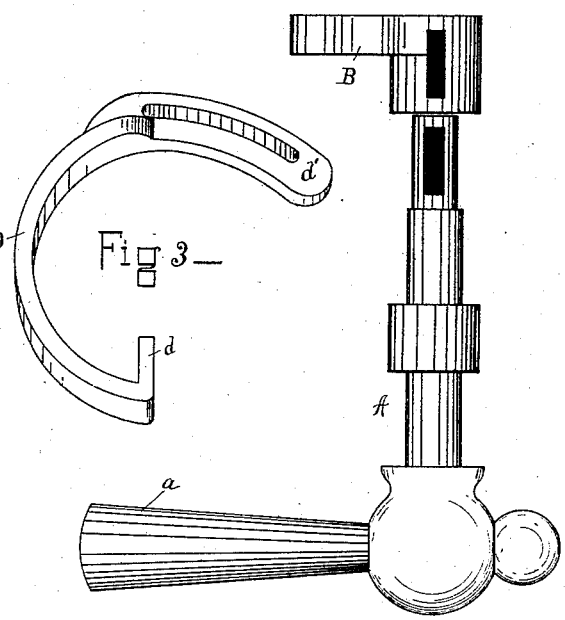
Fig 3.
Fig 4.
Attest
Casper Miles
Christian D. Rapp
Inventor
Henry Pund
By Geo. J. Murray
Atty

UNITED STATES PATENT OFFICE.

HENRY PUND, OF CINCINNATI, OHIO, ASSIGNOR TO JOSEPH L. HALL, OF SAME PLACE.

COUPLING DEVICE FOR SAFE-SPINDLES.

SPECIFICATION forming part of Letters Patent No. 317,471, dated May 5, 1885.

Application filed February 2, 1885. (No model.)

*To all whom it may concern:*

Be it known that I, HENRY PUND, a citizen of the United States, and a resident of Cincinnati, in the county of Hamilton and State of Ohio, have invented certain new and useful Coupling Devices for Safe-Spindles, of which the following is a specification.

My invention is an improved spindle attachment for operating the bolt-work of safes. Its object is a simple, reliable means to disconnect the spindle from the bolt-work when the safe is locked, and couple it with the bolt mechanism when unlocked. With this object in view my invention consists of a peculiar coupling-piece, which is connected to and actuated by the combination-lock to couple and uncouple the spindle and the crank which throws the bolts.

In the accompanying drawings, in which like parts are represented by similar reference-letters wherever they occur throughout the various views, Figure 1 is an inside elevation of a portion of a safe-door provided with my improvements. In this view the safe is unlocked and the spindle coupled with the bolt mechanism. Fig. 2 is a similar view showing the lock-bolt protruded and the spindle disconnected from the bolt mechanism. Fig. 3 is an enlarged perspective view of my coupling-piece. Fig. 4 is an enlarged elevation of the spindle and its crank detached from each other.

The spindle A, its handle a, and crank-arm B are of ordinary construction, as is also the lock C, except the outer end of its bolt, which is connected to the coupling-piece D. The inner end of the spindle A is turned down to neatly fit within the hub of arm B. Both the hub and spindle are perforated with longitudinal slots, which register to receive the inwardly-bent end d of the coupling-piece D. The opposite end, d', of the coupling-piece is flattened and slotted to receive a pin from the forward end, c, of the bolt of lock C. To the inside of the door is secured a stud, E, upon which the end d of the coupling rests when the lock-bolt c is thrown and the spindle disconnected.

Referring to Fig. 1, it will be seen that if the spindle is turned to throw the bolt-work the bent end of the coupling-piece will be brought just above the stud E, and the opposite end, d', carried down until the upper end of the slot rests upon the pin in bolt c. Now, when the bolt c is shot the coupling-piece D is carried with it, its bent end sliding on the stump E until it is entirely withdrawn from the slot in the spindle, but still remains in the slot of the hub, as seen in Fig. 2. The slot through the spindle being at a right angle to the handle a, and the end d being in a horizontal plane when uncoupled, as in Fig. 2, the handle will, by gravity, be carried to a vertical position and its slot held in the proper position to receive the end d when the bolt c is retracted.

I have shown the coupling-piece D curved to arch over the hub and having its end bent to be drawn into the hub and spindle from the side opposite the lock-bolt, and I think this the best form of my invention; but it is evident the form of the coupling-piece can be varied without departing from the principle of my invention.

What I claim as new, and desire to secure by Letters Patent, is—

1. The combination, substantially as specified, of the spindle A, slotted at the inner end, the arm B, having its hub correspondingly slotted with the coupling-piece D, having one end constructed to slide within said slots and couple the spindle with or uncouple it from its hub, and the opposite end of the coupling-piece D, connected with the bolt c of the lock C.

2. The combination, substantially as specified, of the curved coupling-piece D, having the bent end d and slotted end d', with the slotted spindle A, arm B, having its hub correspondingly slotted, and the bolt c of lock C, having a pin to engage the slot in the end of the coupling-piece, for the purpose of coupling or uncoupling the hub and spindle.

3. The combination of the safe-door and its bolt mechanism, of the spindle A, and arm B, for operating said bolts, the hub of said arm and the end of the spindle being correspondingly slotted, as shown, with a coupling-piece, D, having one end connected to the bolt of the safe-lock and the opposite end bent to enter the slots in said hub and spindle, and a stud, E, substantially as specified.

HENRY PUND.

Witnesses:
E. C. HALL,
CHAS. O. HALL.